United States Patent [19]

Grant et al.

[11] Patent Number: 5,218,602
[45] Date of Patent: Jun. 8, 1993

[54] INTERPROCESSOR SWITCHING NETWORK

[75] Inventors: Elwyn E. Grant, Richardson; Gary D. Hanson, Plano; Kimmy F. Nimon, Arlington; James K. McCoy, Garland, all of Tex.

[73] Assignee: DSC Communications Corporation, Plano, Tex.

[21] Appl. No.: 680,327

[22] Filed: Apr. 4, 1991

[51] Int. Cl.$^5$ ............................ H04J 3/02; H04J 3/06; H04L 12/56
[52] U.S. Cl. .................................... 370/58.2; 370/60; 370/94.3
[58] Field of Search ...................... 370/58.1, 60, 94.1, 370/58.2, 61, 85.1, 85.13, 94.3

[56] References Cited

U.S. PATENT DOCUMENTS 4,885,739 12/1989 Read et al. ..................... 370/58.1

Primary Examiner—Douglas W. Olms
Assistant Examiner—Min Jung
Attorney, Agent, or Firm—Baker & Botts

[57] ABSTRACT

A digital switching network for providing simultaneous connections among user processors of processor-based communications equipment. The user processors act as originators and destinations of data communications packets. Packet data connections are through node controllers, which communicate with gateways, which are connected to a switching network via packet links. Control messages are communicated between node controllers, gateways, and an interchange control subsystem via various control message links. All control message processing and packet data transmissions are synchronized with a packet frame synchronization signal, and processing tasks performed by each of the network subsystems are pipelined so that they occur simultaneously. Service requests are queued in a central queue in the interchange control system. The synchronization and queueing simplify the control messages that are required to set up and release the connections.

40 Claims, 13 Drawing Sheets

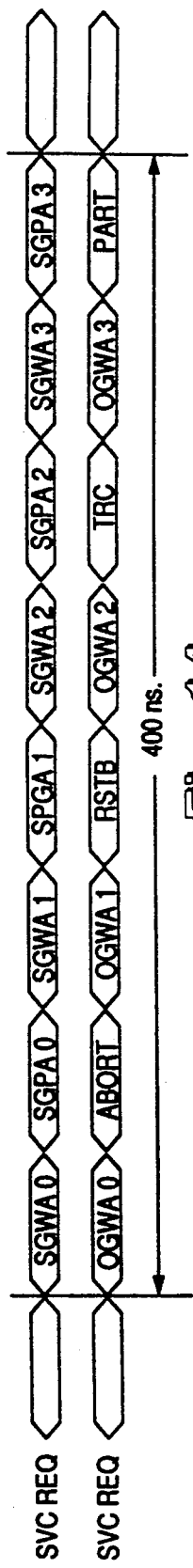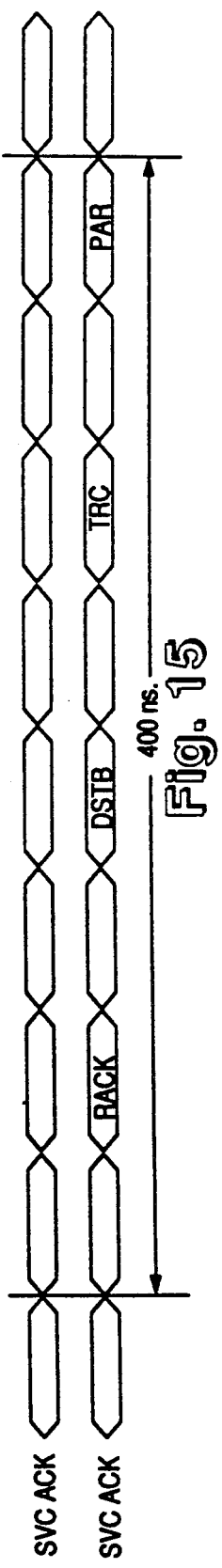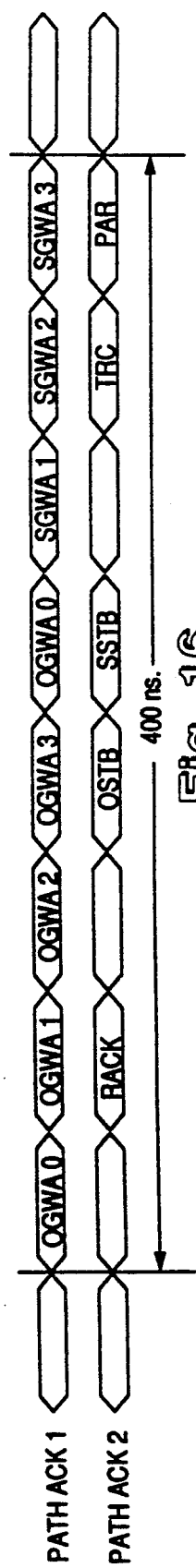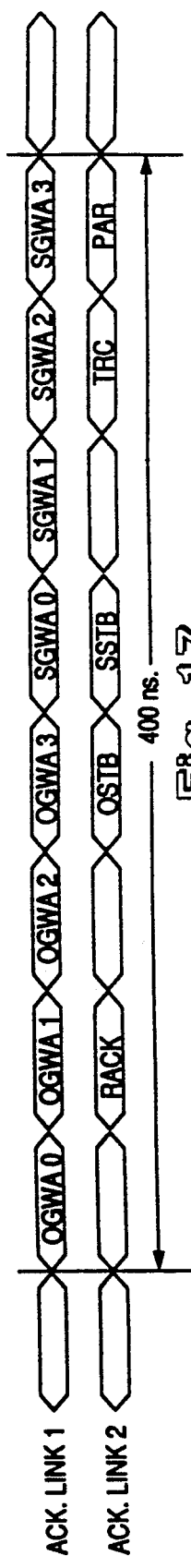

INTERPROCESSOR SWITCHING NETWORK

TECHNICAL FIELD OF THE INVENTION

This invention relates to digital switching networks, and more particularly to a packet switching network for providing a communications path among a plurality of processors that handle messages at a source and a destination.

BACKGROUND OF THE INVENTION

Recent advances in data communications have given rise to a need for methods of connecting a large number of high performance processors in a distributed processing system. The goal of such methods is to maximize the number of processors that may be simultaneously interconnected and to minimize the time required to make the connections.

U.S. Pat. No. 4,885,739, entitled "Interprocessor Switching Network" and assigned to the present assignee, describes a digital switching network for handling data transfers among a number of processors. The switching network is used with a distributed system of data stations, such as systems of computers or telephones with related supervisory and peripheral equipment. Cluster processors handle messages at each data station and are organized into nodes, each having a node controller. Point-to-point connections are via a switching matrix, and the data transmission uses packet switching techniques to transfer data and various control messages from node to node or within a node.

The switching network described in U.S. Pat. No. 4,885,739 is characterized by several hardware features, including node controllers for handling nodes of cluster processors, gateways for providing an interface for node controllers into the switching matrix, interchange control system, and an interchange that includes the switching matrix. It is also characterized by the use of a multi-level communications protocol, having at least three levels. A first level handles communications between gateways and the switching matrix. A second level handles communications between node controllers. A third level handles communications between application processors of the user's equipment.

U.S. patent application Ser. No. 07/717,420, entitled "Synchronous Node Controllers for Switching Network", assigned to the present assignee, describes a system of node controllers, in which node controller processing is synchronized so that each node controller performs the same tasks simultaneously. This system reduces processing overhead involving the level two and level three protocols.

Typically, in switching networks such as that of U.S. Pat. No. 4,885,739, the level one protocol involves a number of control messages. Processing tasks are triggered by the receipt of appropriate messages. These messages include service, path, and release requests and corresponding acknowledgements. The messages contribute to processing overhead in that not only are a number of different messages used, but also the different messages are exchanged between the various components.

Although this technique works well in practice, as the number of data stations increases, so does the complexity of the switching process. The generation and communication of the various control messages requires increased processing overhead. A need exists for an improved method of using a switching network to handle a large number of messages in a given time.

SUMMARY OF THE INVENTION

One aspect of the invention is a switching network for providing data communication between user processors of processor-based communications equipment. The processors are arranged in clusters having nodes and a node controller. A switching matrix establishes a point-to-point connection between an originating processor and a destination processor. An interchange control system in communication with the switching matrix, has at least one request buffer for multiplexing service request control messages from originating processors, and has a connection controller for maintaining a central queue of service requests and for establishing connections within the switching matrix in accordance with the service requests. A gateway system provides access from the node controllers to the switching matrix for transmissions of packet data, and provides access from the node controllers to the interchange control system for transmissions of control messages. The switching network transfers packet data in accordance with a protocol of control messages that include the service requests, and is synchronized with a packet frame synchronization signal, such that the operations of the switching matrix, interchange control system, and gateway system occur in periodic cycles. Various processing steps associated with the transmission of packets are simultaneously performed, such that certain steps associated with a current packet are performed during the same frame as steps associated with a next or previous packet.

A technical advantage of the invention is that it provides switching for a large number of connections, but yet permits control operations to be relatively simple. Several control messages, which are required in existing switching networks, are not needed. More specifically, centralized queueing of service requests eliminates the need for outbound service requests and path requests. Packet frame synchronization eliminates the need for release requests. Service requests are handled in order of receipt, even if deferred, which results in a "fair" treatment of requests.

BRIEF DESCRIPTION OF THE DRAWINGS

FIG. 14 illustrates the format for the RB service request links.

FIG. 15 illustrates the format for the RB service acknowledge links.

FIG. 16 illustrates the format for the RB path acknowledge links.

FIG. 17 illustrates the format for the RB release acknowledge links.

DETAILED DESCRIPTION OF THE INVENTION

List of Abbreviations

The following is a explanation of abbreviations used in this patent application.

| | |
|---|---|
| CC | connection controller |
| CCS | common channel signalling |
| CP | cluster processor |
| DSTB | data strobe |
| FIFO | first-in, first out |
| GC | group controller |
| GPA | group address |
| GW | gateway |
| GWA | gateway address |
| GWY | gateway |
| L1 | Level 1 |
| L2 | Level 2 |
| L3 | Level 3 |
| L4 | Level 4 |
| MC | maintenance controller |
| NC | node controller |
| ns | nanosecond |
| O** | originating device or message, i.e., ONC for originating node controller |
| OGWY | originating gateway |
| ONC | originating node controller |
| OPAK | originating path acknowledgement |
| ORAK | originator request acknowledge |
| PAR | parity |
| PFS | packet frame synchronization |
| RAM | random access memory |
| RACK | request acknowledge |
| RB | request buffer |
| RFSAK | service request acknowledgement |
| RSTB | request strobe |
| S** | server device, i.e., SNC for server node controller |
| SGPA | server group address |
| SGW | server gateway |
| SGWA | server gateway address |
| SM | switching matrix |
| SN | switching network |
| SNC | server node controller |
| SPAK | server path acknowledgement |
| SRAK | server request acknowledge |
| STB | strobe |
| TRC | trace indicator |

Typical Applications of the Switching Network

Figure 1:
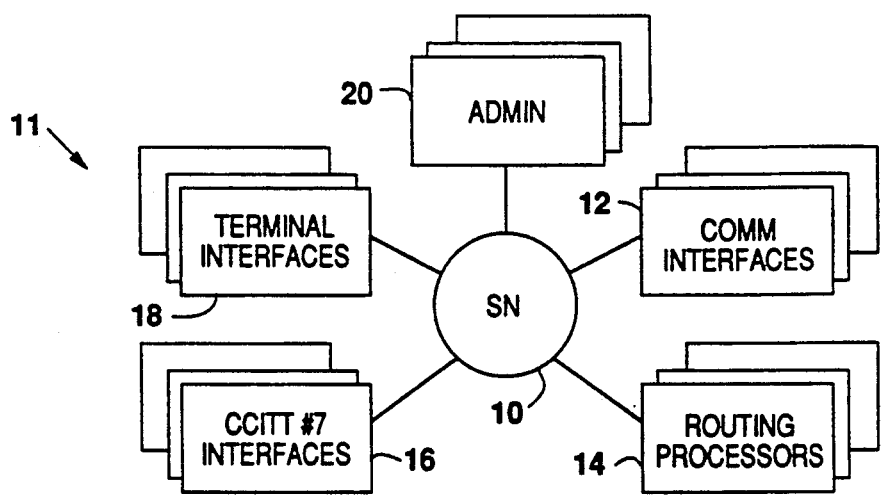
FIG. 1 illustrates one type of distributed processor communications system, with which the invention may be used.
Figure 2:
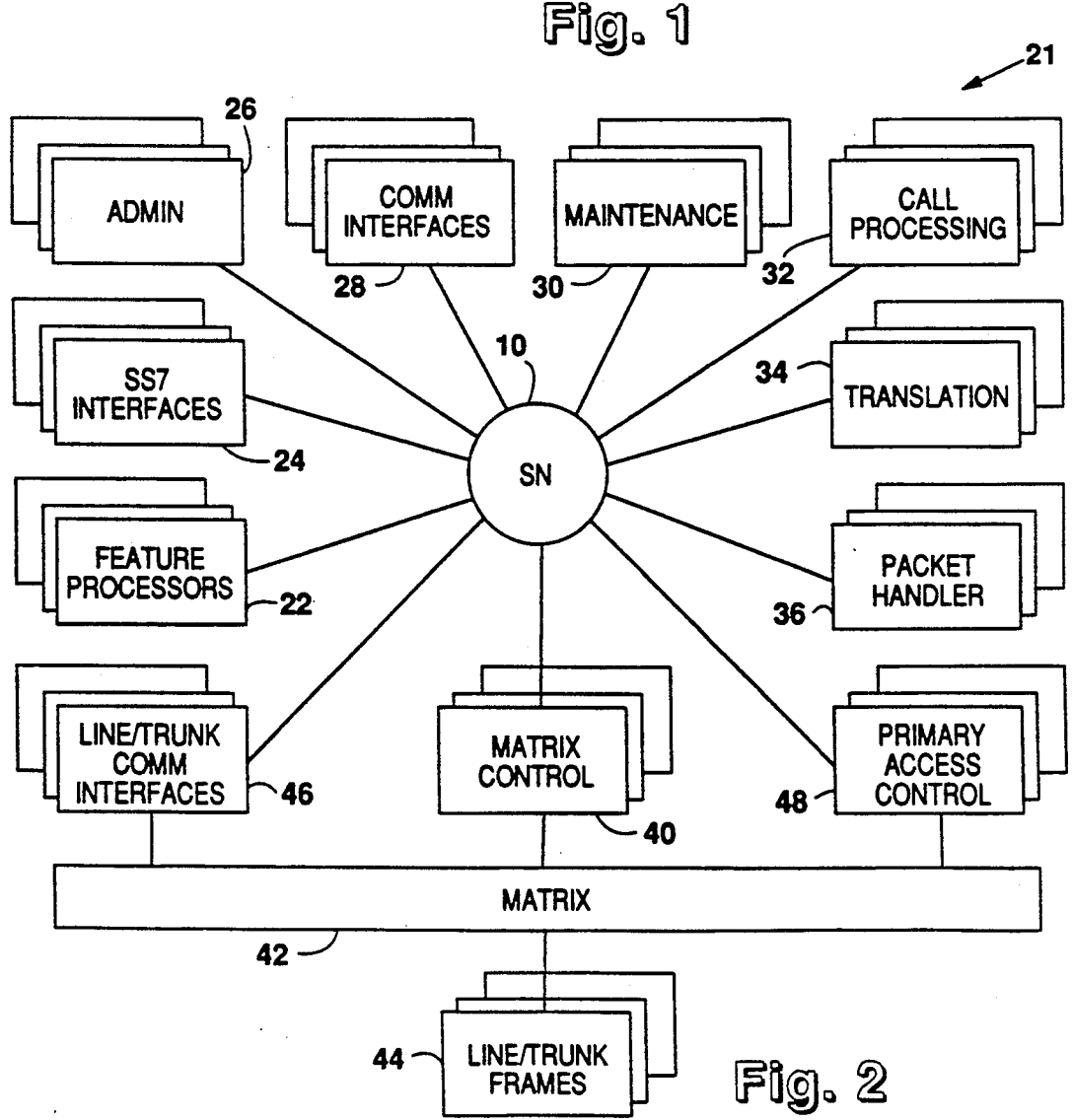
FIG. 2 illustrates another type of distributed processor communications system, with which the invention may be used.

FIGS. 1 and 2 illustrate two different distributed processing systems, with which the invention may be used. In each of these figures, the invention is referred to as switching network (SN) 10.

In FIG. 1, SN 10 is used as a signal transfer point in a common channel signalling (CCS) system. In a CCS system, communications links carry data across the system, using packet switching nodes. These packet switching nodes are known as signal transfer points. As common channel signalling becomes more prevalent in data communications systems, the message throughput requirements for signal transfer points increase. SN 10 is designed to accommodate these demands.

In FIG. 2, SN 10 is used as part of a telephone switch control system 21. In this embodiment, SN 10 is connected to a number of processor blocks, which include feature processors 22, SS7 interfaces 24, administrative support equipment 26, communication interfaces 28, maintenance processors 30, call processing equipment 32, translation equipment 34, and packet handlers 36. These processor blocks are connected through SN 10 to provide a fast communications between the processors. A matrix control circuit 40 interfaces SN 10 to a switch matrix 42. Line/trunk frames 44 are connected to matrix 42 and line/trunk interfaces 46 and primary access control circuits 48 are connected between SN 10 and matrix 40.

Overview of the Switching Network Structure

Figure 3:
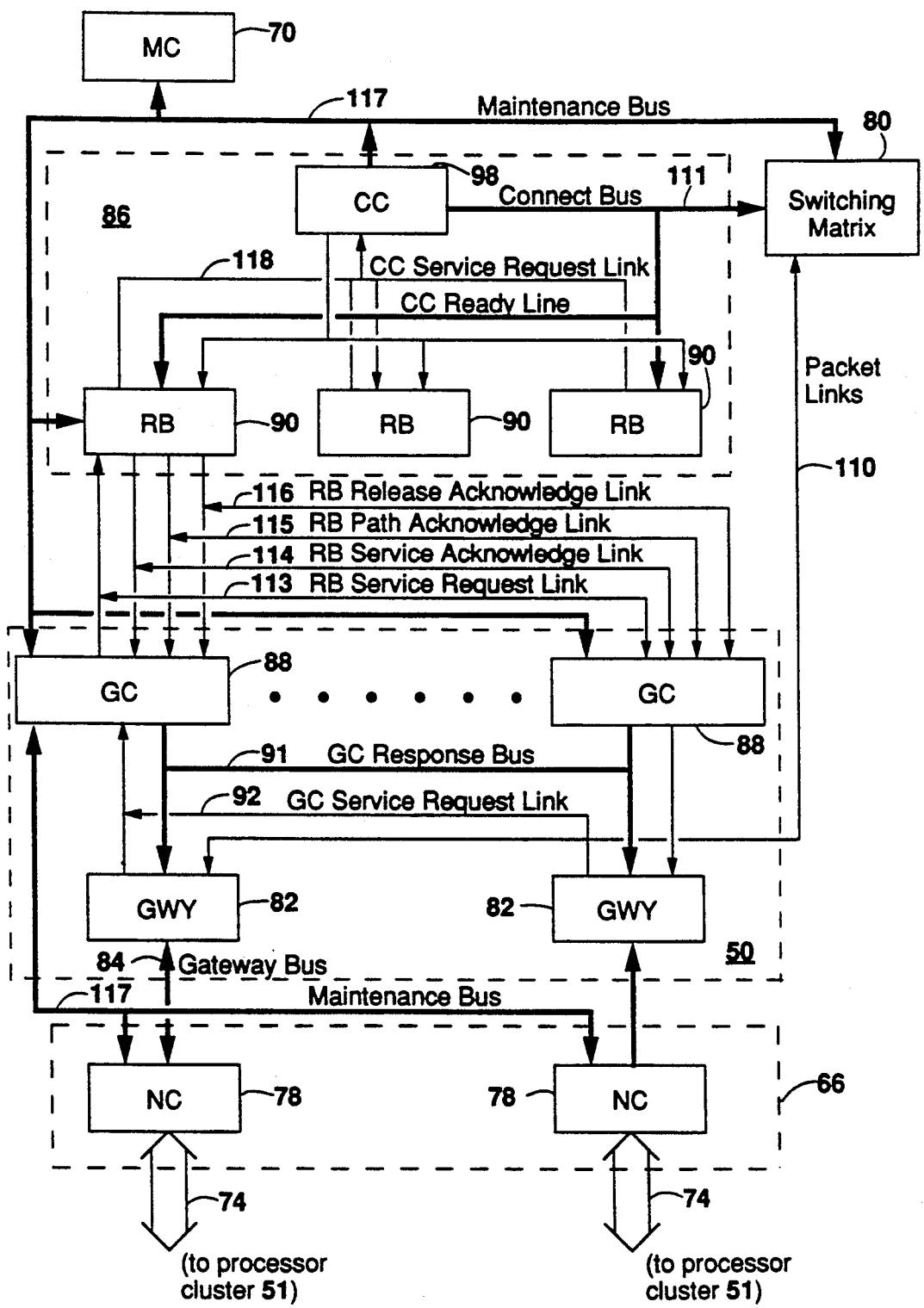
FIG. 3 is a block diagram, which illustrates the basic components of the switching network.

FIG. 3 is a block diagram of SN 10, including a node control system 66. The basic components of SN 10 are gateways (GWY) 82, gateway group controllers (GC's) 88, interchange control (INC) system 86, maintenance control (MC) system 70, and SM (switching matrix) 80.

For purposes of simplicity, FIG. 3 shows gateway system 50 with only one group of GWY's 82 However, the complete gateway system 50 has a number of groups of gateways 82. Similarly, FIG. 3 shows only one group of NC's 78 for one gateway group, whereas a complete SN 10 has a group of NC's 78 for each of a number of gateway groups.

The embodiment described herein has 3 RB's 90, each of which are associated with 4 GC's 88. Each GC 88 is associated with 16 GWY's 82. Thus, SN 10 has up to 192 NC's 78 and 192 nodes.

The operation of SN 10 involves communications on three protocol levels. Level 1 (L1) is for requesting the creation of links between GWY's 82, and subsequent release, within SM 80. Level 2 (L2) is for communications between NC's 78. Level 3 (L3) is for communications between CP's 72. A fourth level, Level 4 (L4), is used for maintenance functions, such as tracing, parity, and selection of redundant planes, as well as for providing a timing signal for packet frame synchronization (PFS).

Node control system 66 has a number of node controllers (NC's) 78, which are connected to an application system having a number of processors, such as those described above in connection with FIGS. 1 and 2. The processors of the application system are herein referred to as "cluster processors" (CP's) 72. It is assumed that each CP 72 has access to interface memory for storing flags, messages, and data. The interface between SN 10 and the applications system, which includes a processor cluster bus 74, is further explained below in connection with FIG. 6. The structure and operation of node control system 66 is described in connection with FIG. 7.

GWY's 82 provide NC's 78 with a L1 protocol interface and access to packet links 110. Each GC 88 acts as an interface between its group of GWY's 82 and the services of its RB 90. GWY's 82 and GC's 88 are described below in connection with FIGS. 8-10.

Interchange control system 86 has two basic functions: monitoring the status of GWY's 82 and generating connection commands for SM 80. Connection controller (CC) is in communication with SM 80 via a connect bus 111. CC 98 is also in communication with a number of RB's 90. Each RB 90 serves a group controller (GC) 88, which in turn, each control a gateway group, having a number of gateways (GWY's) 82. Interchange control system 86 is described below in connection with FIGS. 11 and 12.

SM 80 establishes point-to-point connections between a source CP 72 destination CP 72, using a switching matrix. Transfer of packet data occurs via packet links 110 from GWY's 82. SM 80 is described below in connection with FIG. 13.

There are two groups of packet links 110, inbound and outbound. Inbound links carry L2 packet data from GWY's 82 to SM 80. Outbound links carry packets from SM 80 to GWY's 82. The packet data travels from GWY's 82 through SM 80, and back out GWY's 82.

Communications of L1 control messages within interchange control system 86 and to GWY's 82 are accomplished with various connection command links. These links and their formats are explained below in the "Interconnections" section of this patent application.

In each of these subsystems of SN 10, various components may be duplicated for redundancy in case of equipment failure. Redundant pairs of elements are herein referred to equivalently as a unit or a pair, i.e., NC 78 or NC pair 78. Elements of a pair are referred to as A and B copies. If a pair is used, it is assumed that appropriate inputs and outputs are to both components comprising the pair.

Synchronized Operation

Pending U.S. patent application Ser. No. 07/717,420, referred to above and incorporated by reference herein describes a NC system 66 and a method for synchronizing the operation of NC's 78. The L2 and L3 protocols used by SN 10 are described in that patent application.

Figure 4:
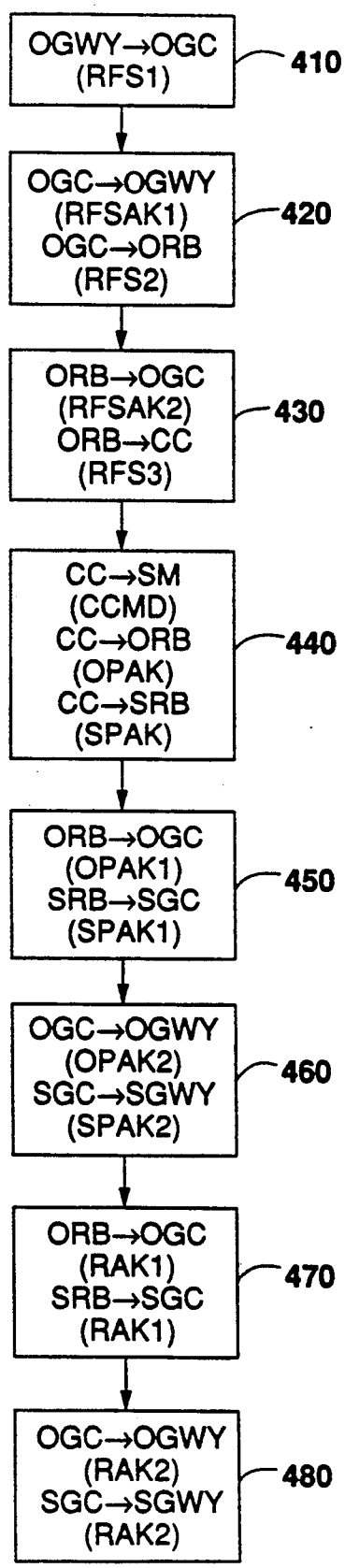
FIG. 4 illustrates the level 1 protocol used by the switching network.

FIG. 4 illustrates the Level 1 protocol used by SN 10. The complete transfer of a message has three phases: service request and request acknowledge, path establish and acknowledge, and release acknowledge.

Steps 410–430 illustrates the service request and request acknowledge phase. In step 410, the OGWY 82 sends a service request to its GC 88. In step 420, the GC 88 acknowledges the request and sends the request to its RB 90. In step 430, the RB 90 acknowledges the request and sends it to the CC 98.

Steps 440–460 illustrates the path establish and acknowledge phase. In step 440, the CC 98 transfers connection commands to SM 80 and transfers path acknowledgements to ORB 90 and SRB 90. In step 450, the ORB 90 and SRB 90 send their respective OPAK and SPAK messages to their GC's 88. In step 460, the GC's 88 send the OPAK and SPAK messages to their GWY's 82.

Steps 470 and 480 illustrates the release acknowledge phase. In step 470, ORB 90 and SRB 90 send ORAK and SRAK messages to their GC's 88. In step 480, the GC's 88 send the ORAK and SRAK messages to their GWY's 82.

The L1 protocol is implemented with synchronization within SN 10 and centralized queueing of service requests. The service request queueing is accomplished with special buffers in CC 98, as described below in connection with FIG. 12. An advantage of the queueing is that it eliminates the need for outbound service requests, i.e., those to a server NC 78, and path requests.

Packet frame synchronization eliminates the need for release requests. Packet transfers occur within fixed intervals with respect to a packet frame and are completed before the end of the frame. Each NC 78 checks the status of server acknowledge and originator acknowledge signals from its associated GWY 82 twice during every packet frame. A first check is for receipt of an originator or server path acknowledgement (OPAK or SPAK), and the second check is to make sure that a release has occurred. These status checks occur at fixed times within the packet frame. Thus, RB's 90 generate release acknowledgements automatically, without the need for a release request. A register on each RB 90 controls the timing of a release acknowledgement within the packet frame so that it is received by GWY 82 between the time NC 78 checks for OPAK or SPAK and the time it checks for release.

To maintain compatibility with other versions of SN 10, although path and release requests are not required, interchange control subsystem 86 ignores them if they are received.

Path acknowledgements are transmitted within a fixed time interval with respect to the packet frame. Release acknowledgements are also transmitted within a fixed time interval and are transmitted to all GWY's 82 regardless of whether or not all GWY's 82 were involved in a packet transfer during that frame.

The duration of a packet frame is typically in the range of 30 microseconds to 120 microseconds. Although packet transfers occur within a single frame, due to pipelined operations within SN 10, it takes several packet frames for a service request to be delivered from a NC 78 to CC 98 and be processed in CC 98, a connection established in SM 80, and a path acknowledgement returned to NC 78.

Figure 5:
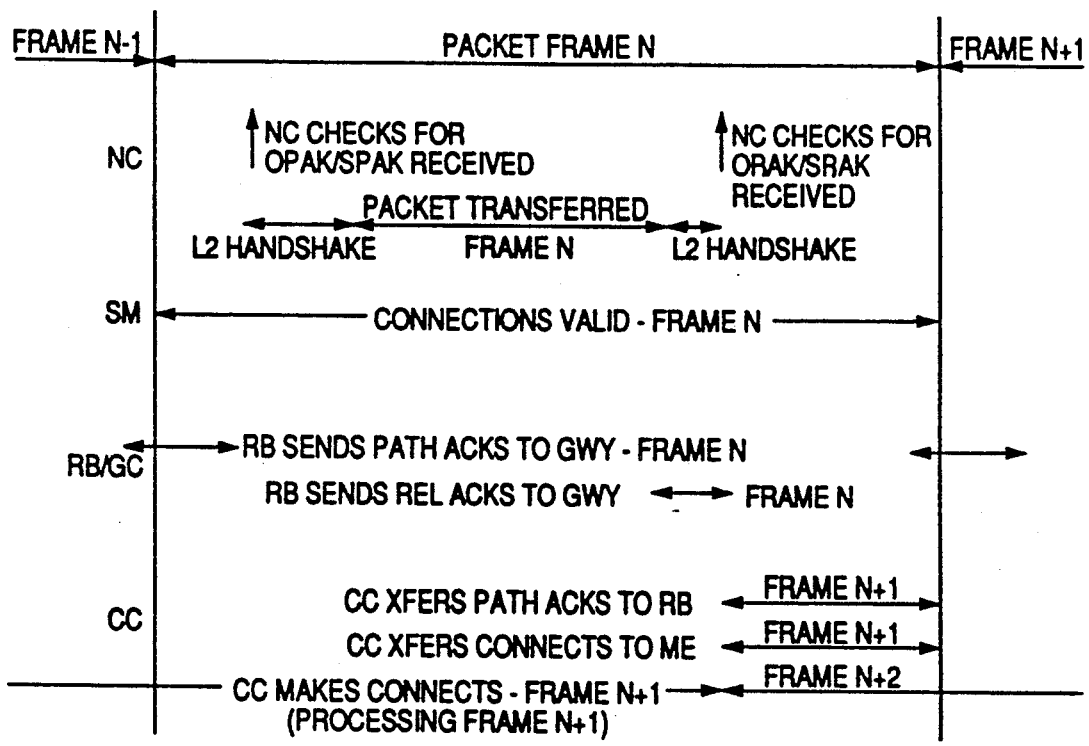
FIG. 5 illustrates the pipelined operation of the switching network.

FIG. 5 illustrates the pipelined operations of SN 10. The packet frame, i.e., frame n, is identified with the packet frame during which actual packet transfers take place. All other operations are referenced to this frame n. The following operations are executed in parallel within a single frame period:

(1) NC's 78 send service requests to their GWY's 82. The GWY's 82 send the requests to GC's 88, which relay the requests to RB's 90 for frame n+2 and beyond.

(2) CC 98 first processes all of the requests deferred from the previous packet frame period, and then processes the new requests coming from RB's 90 to produce as full a set of SM 80 connections as possible for frame n+2.

(3) CC 98 sends connection commands and path acknowledgments to SM 80 and RB's 90, respectively, for the set of connections to be established in frame n+1.

(4) RB's 90 send path acknowledgements to GWY's 82 for frame n at the beginning of frame n, and send release acknowledgments to GWY's 82 for frame n at the end of frame n.

(5) SM 80 establishes a connection path for frame n for the duration of the frame. NC's 78 execute the L2 protocol and transfer packets.

It should be understood that although FIG. 5 illustrates one connection, a number of connections may simultaneously occur.

Node Control System

Referring again to FIG. 3, node control subsystem 66 comprises a number of node controllers (NC's) 78. As stated above, FIG. 3 provides only a partial picture of the complete system of NC's 78. Each NC 78 is associated with a separate node, where a "node" is defined as the point at which a cluster of CP's 72 connects to SN 10. Thus, as explained above, SN 10 may have up to 192 NC's and accommodate up to 192 nodes.

Figure 6:
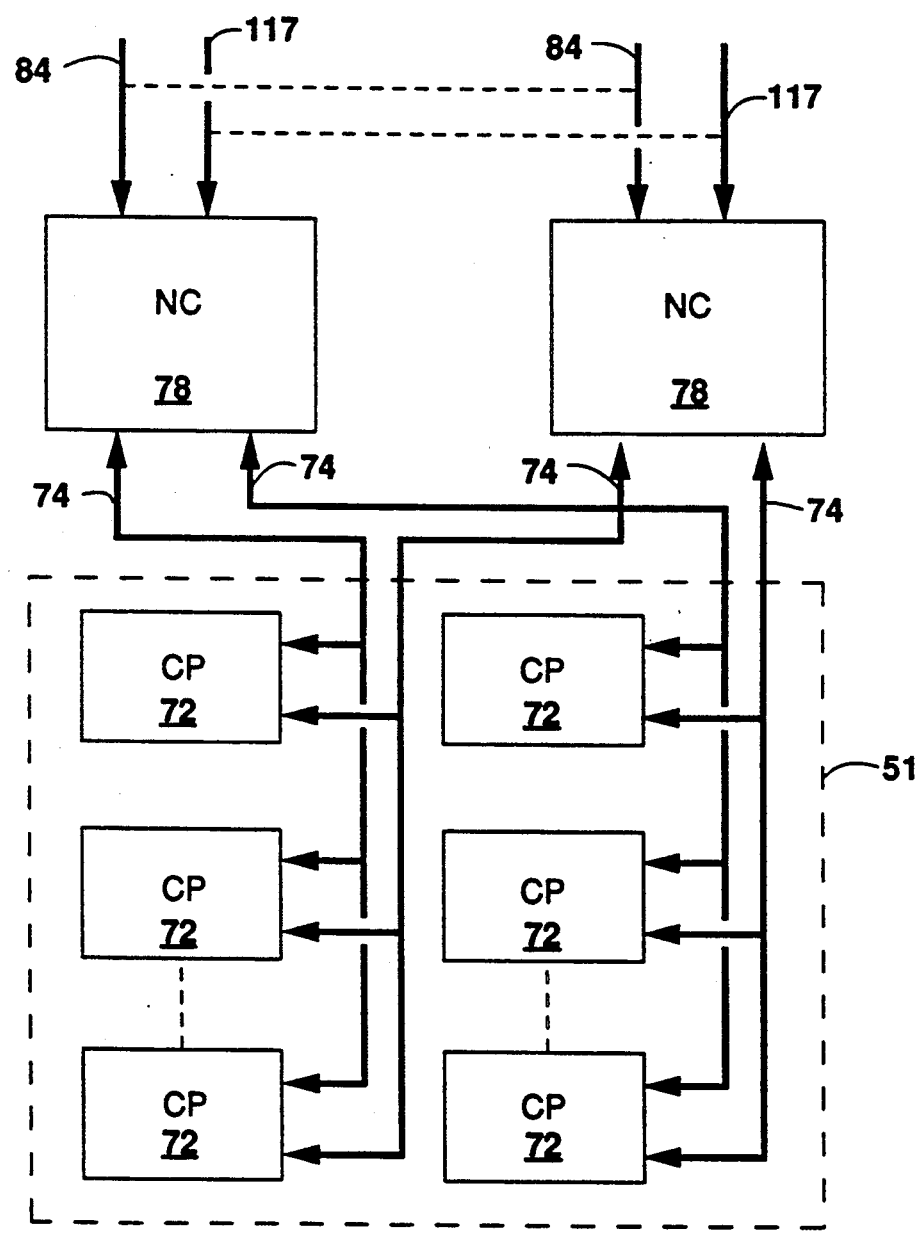
FIG. 6 is a block diagram of a node controller pair and its connection to a processor cluster.

FIG. 6 illustrates a NC pair 78 and its connection to a cluster of processors 51. For redundancy, NC's 78 are used in pairs, with each pair supporting a processor cluster 51. Thus, the SN 10 embodiment of this description, when fully configured, supports 96 processor clusters 51. Processor cluster 51 could be part of one of the applications system described above in connection with FIGS. 1 and 2 or could be some other system using processors that communicate with each other. In the embodiment of FIG. 6, each processor cluster 51 consists of 16 redundant pairs of CP's 72, for a total of 32 CP's 72 per cluster 51.

Figure 7:
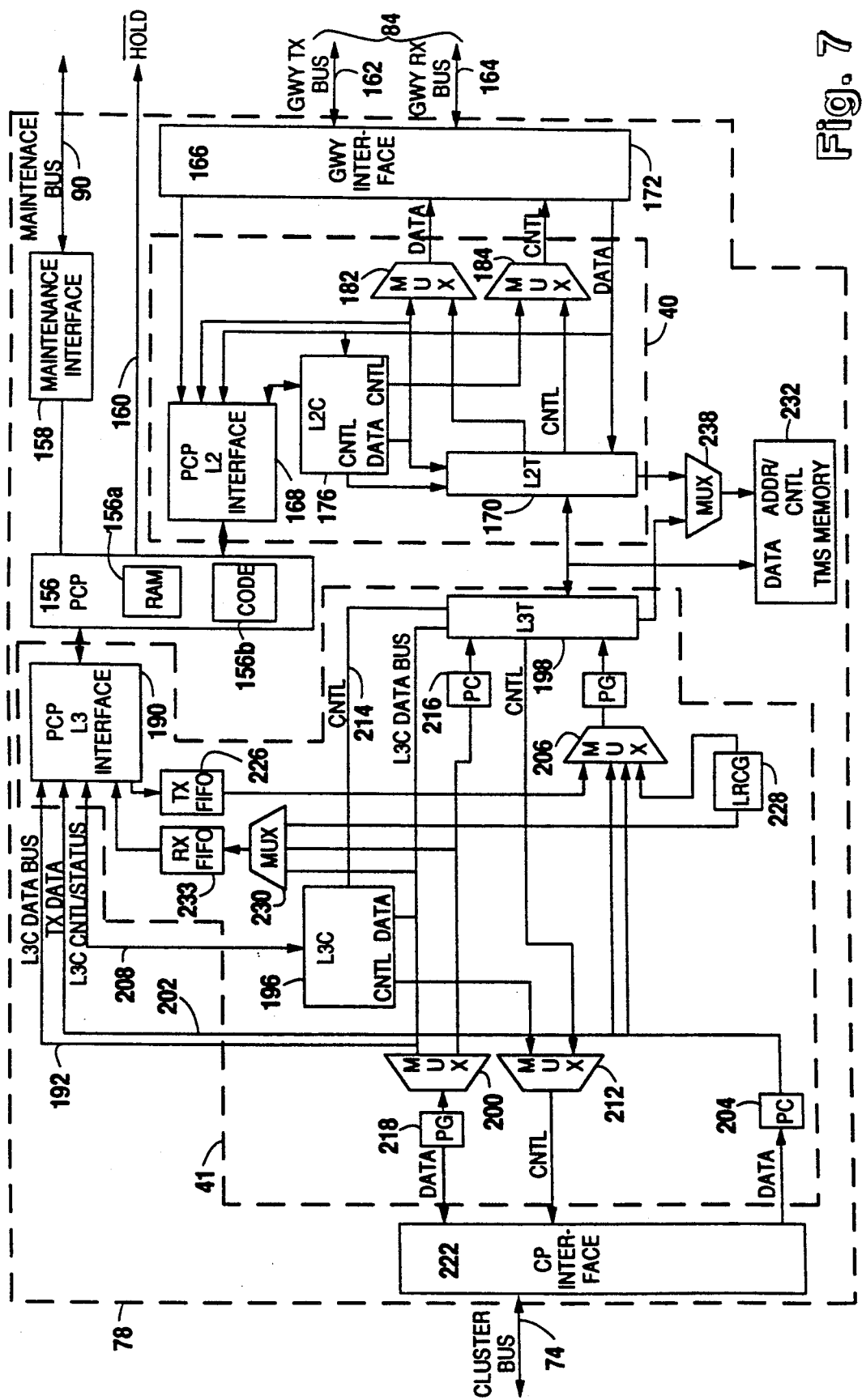
FIG. 7 is a block diagram of a node controller.

FIG. 7 is a block diagram of a NC 78. The general structure and operation of NC's 78 is described in detail in the co-pending U.S. patent application Ser. No. 07/717,420, referred to above. That patent application describes a system of NC's 78, whose processing is synchronized so that all NC's 78 perform the same processes simultaneously.

In general, an originating NC (ONC) 78 initiates a service request when it requires connection to a server NC (SNC) 78. The ONC 78 initiates the service request by writing a server address into a server address register in OGWY 82, followed by activating a service request signal. After a packet transmission is complete, the service request is cleared in ONC 78 by a service request acknowledgement being returned.

Gateways and Group Controllers

Referring again to FIG. 3, in the embodiment of this description, 16 GWY's 82 comprise a gateway group and are associated with a GC 88. Up to 12 gateway groups may be used to comprise a complete gateway subsystem 50, which supports 192 nodes.

Figure 8:
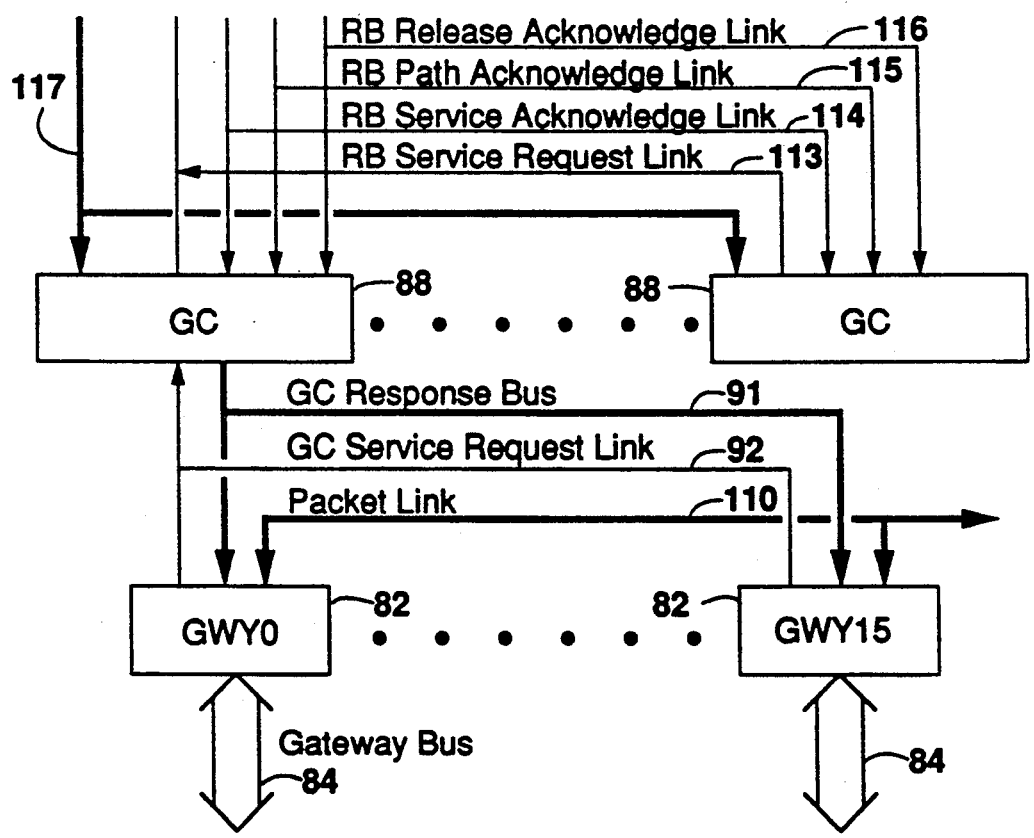
FIG. 8 is a block diagram of a gateway group and its nodes.

FIG. 8 shows one gateway group and its 16 nodes, where GC 88 is a redundant pair. Referring to both FIGS. 3 and 8, each GWY 82 uses four interconnects, namely, a gateway bus 84, GC response bus 91, GC service request link 92, and packet links 110. In operation, GWY's 82 provide NC's 78 and CP's 72 with access to SN 10 via gateway bus 84. GWY's 82 access GC's 88 via GC service request links 92 and GC response bus 91. GWY's 82 access SM 80 via packet links 110 for transporting data packets between NC's 78, or between a NC 78 and a CP 72, or between two CP's 72.

Figure 9:
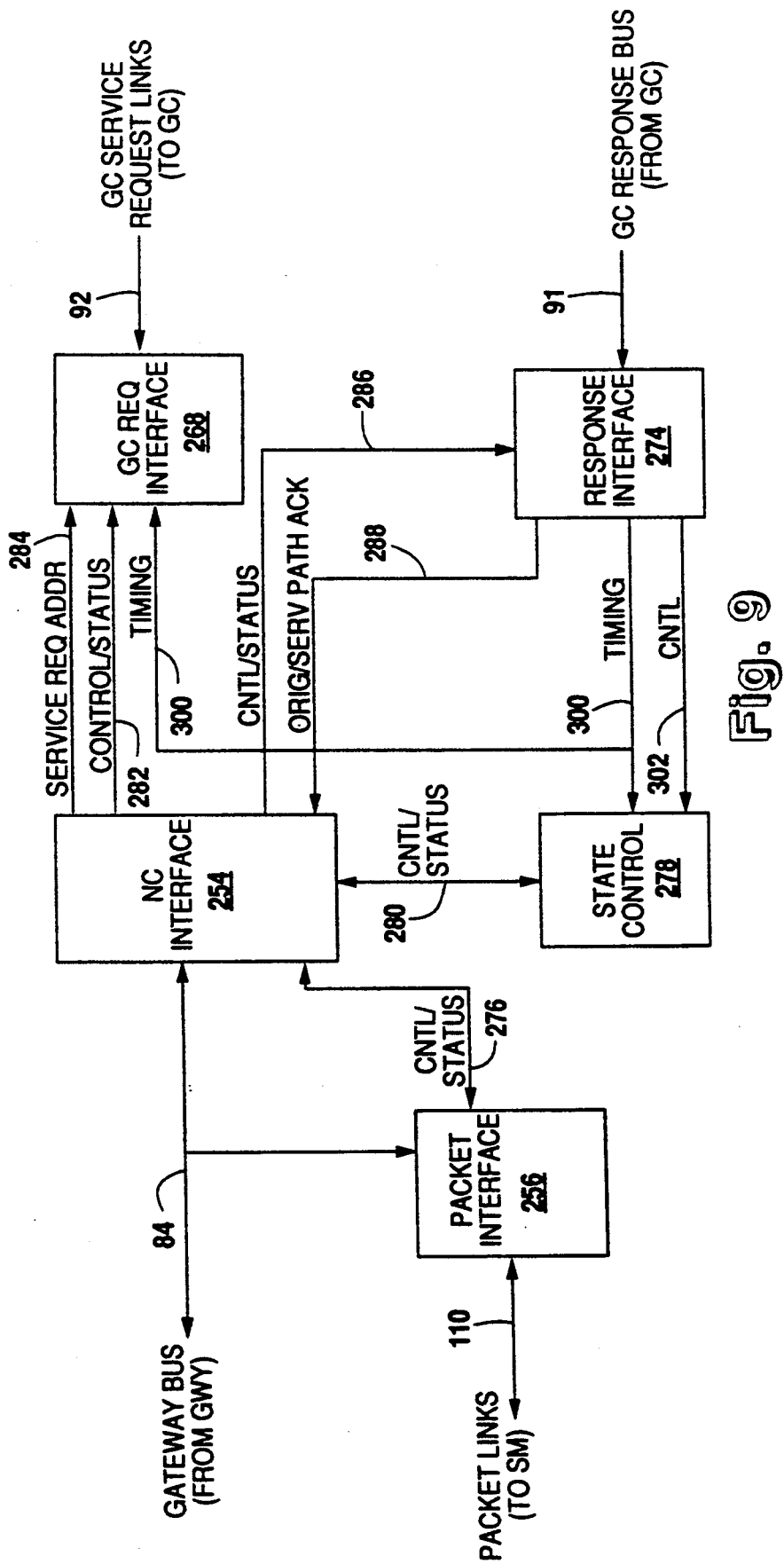
FIG. 9 is a block diagram of a gateway.

FIG. 9 is a block diagram of a GWY 82, which shows the interconnects of a GWY 82 and the internal components of each GWY 82. These internal components include a NC interface 254, a packet interface 256, a GC request interface 268, a GC response interface 274, and a state controller 278.

Gateway bus 84 connects each GWY 82 to a NC 78. Gateway bus 84 has a number of functions. A first function is the exchange of data between a NC 78 and packet links 110. A second function is receiving service requests from NC 78. A third function is acknowledging a path to NC 78. A fourth function is supporting maintenance tasks.

GC response bus 91 and GC request link 92 connect GWY 82 to GC 88. More specifically, GC request link 92 transmits service requests from GWY 82 to an associated GC 88. GC response bus 91 is used by a GC 88 to transmit the following signals to its GWY's 82: service request acknowledgements, originator path acknowledgements, server path acknowledgements, and release acknowledgements.

NC interface 254 is connected to packet interface 256 via a control/status line 276. NC interface 254 is connected to state controller 278 by a control/status line 280. NC interface 254 is connected to GC request interface 268 by a control/status line 282 and a service request address line 284. NC interface 254 is connected to GC response interface 274 by a control/status line 286 and by an originating/server path acknowledge line 288.

GC request interface 268 is connected to GC response interface 274 by timing line 300. State controller 278 is connected to GC response interface 274 via timing line 300 and control line 302.

Packet interface 256 handles transfers of packet data via packet links 110. It is connected to NC interface 254 via control/status line 276. It receives clock signals from SM 80 via packet link 110.

Referring again to FIGS. 3 and 8, each GC 88 is an interface between its group of GWY's 82 and the services of its associated RB 90. GC's 88 are connected to NC's 78 via a maintenance bus 117, to GWY's 82 via GC response bus 91 and GC request link 92, and to RB's 90 via a number of request and acknowledge links 113, 114, 115, and 116.

Figure 10:
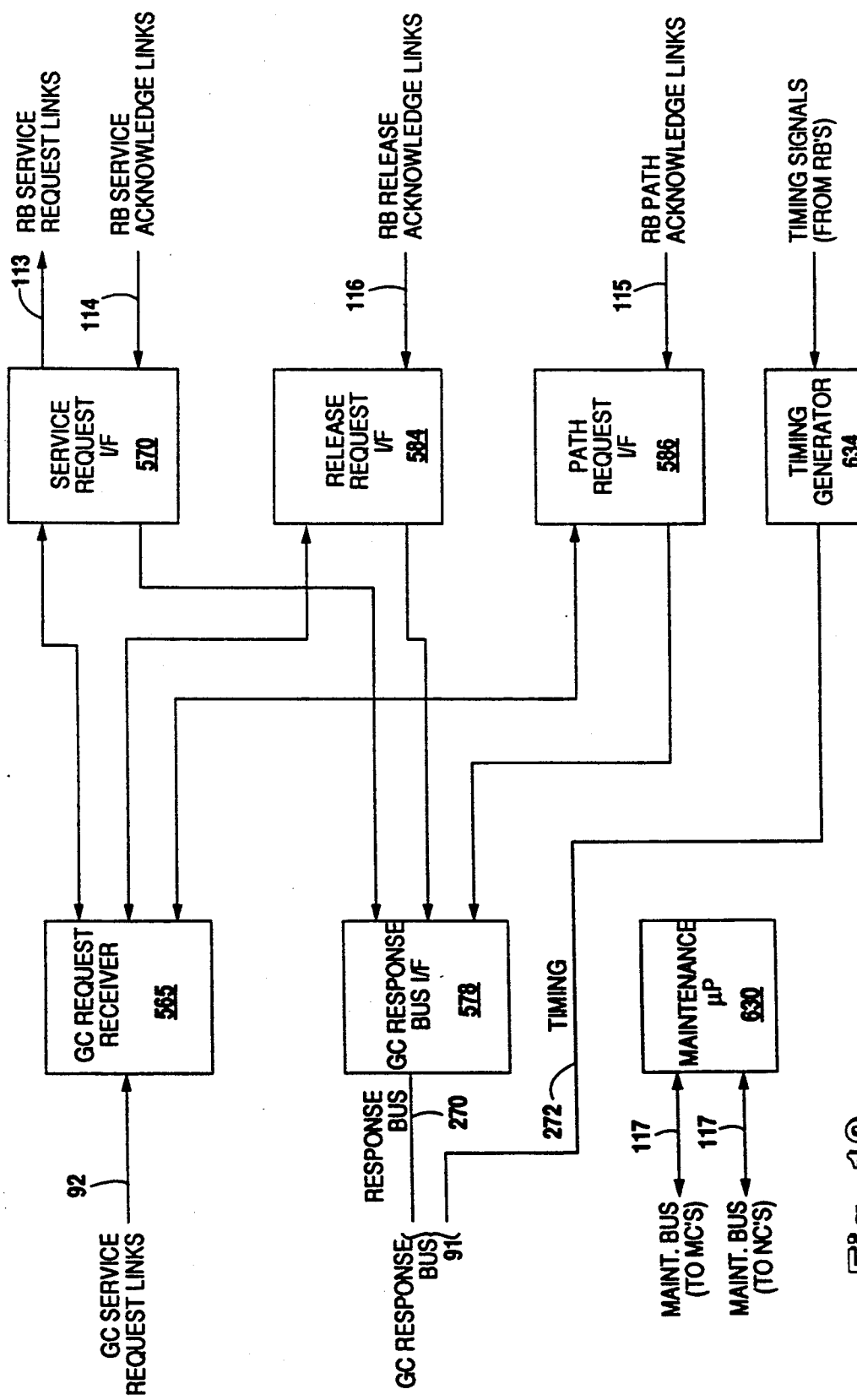
FIG. 10 is a block diagram of a group controller.

FIG. 10 is a block diagram of a single GC 88. The main components of GC 88 are a GC request receiver 565, GC response bus interface 578, service request interface 570, path request interface 586, release request interface 584, timing generator 634, and maintenance microprocessor 630.

GC 88 multiplexes requests from its GWY's 82, so that only one request from its GWY group is accepted at one time. An originating service request is initiated by an ONC 78 when it requires connection to a SNC 78. The server gateway address (SGWA) and the server group address (SGPA) are passed to GC 88 with the service request. After initiation of a service request, request link 92 is busy until GC 88 accepts the request. Once GC 88 accepts the request, it responds with a service request acknowledgement (RFSAK) on response bus 91 to OGWY 82 to indicate that a request has been accepted. The RFSAK message idles request link 91 so that it is available for other transactions.

Further details about the structure of GWY's 82 and GC's 88 are set out in U.S. Pat. No. 4,885,739, which is incorporated by reference to the extent not inconsistent with the description herein.

Interchange Control Subsystem

Referring again to FIG. 3, interchange control subsystem 86 comprises a number of request buffers (RB's) 90 and a connection controller (CC) 98.

In the embodiment of this description, there are 3 RB's 90. Each RB 90 serves a maximum of 4 GC's 88, and thus serves 64 GWY's 82.

Figure 11:
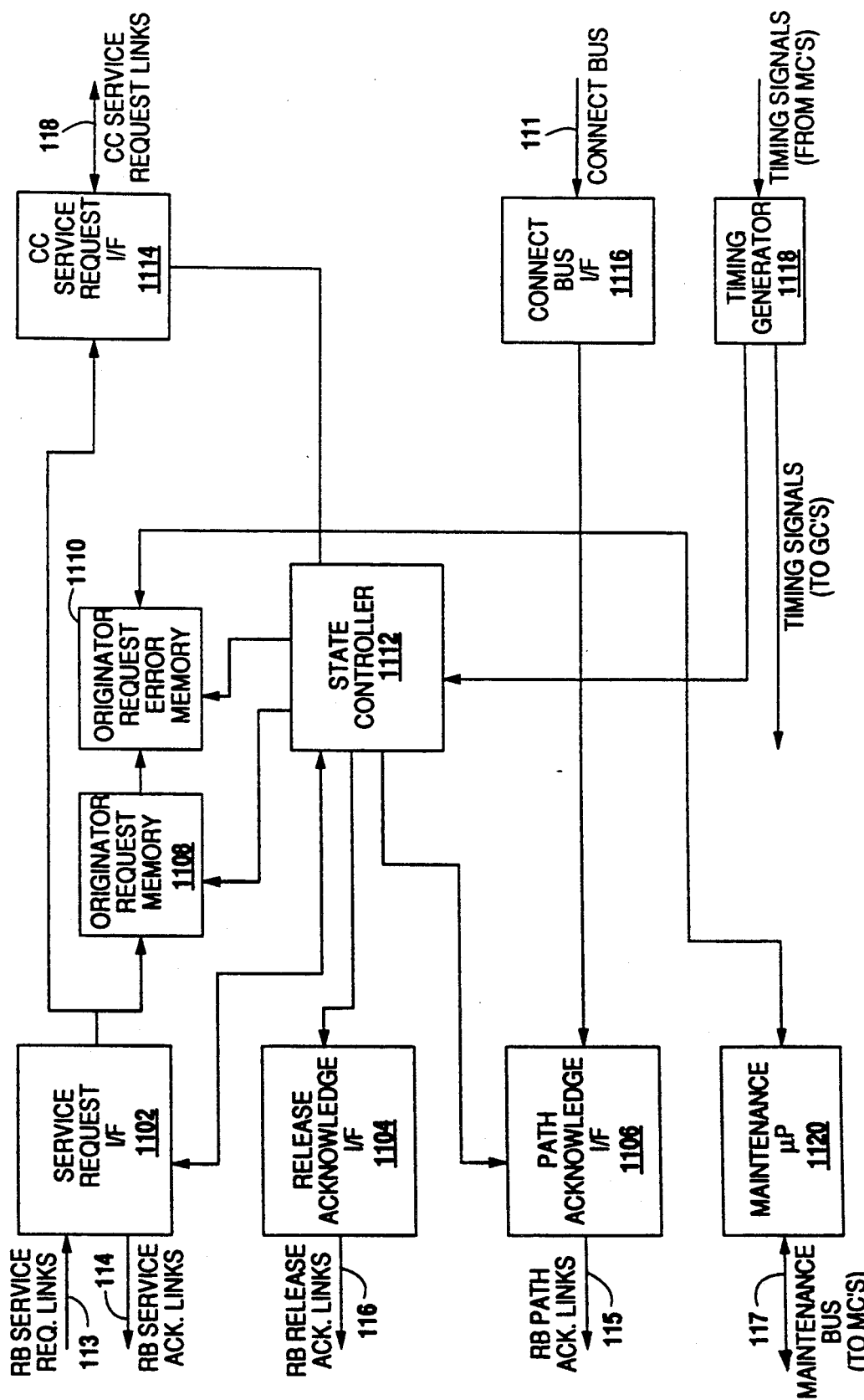
FIG. 11 is a block diagram of a request buffer.

FIG. 11 is a block diagram of one RB 90. Its main components are a service request interface 1102, release acknowledge interface 1104, path acknowledge interface 1106, originator request memory 1108, originator request error memory state controller 1112, CC service request interface 1114, connect bus interface 1116, timing generator 1118, and maintenance microprocessor 1120.

Each RB 90 provides multiplexing for originator service requests from its associated GC's 88 to its associated CC 98 via RB service request links 113. RB 90 receives a service request from a GC 88, converts the serial data stream into a parallel format, and multiplexes the request onto CC service request link 118. RB service request links 113, RB service acknowledge links 114, RB path acknowledge links 115, and RB release acknowledge links 116 are described below in connection with FIGS. 14–17.

RB 90 receives path acknowledgements from CC 98 via connect bus 111. RB 90 buffers them for one packet frame period, then distributes them to its GC's 88 via RB path acknowledge link 115. RB 90 also sends, via its GC's 88, release acknowledgements to its GWY's 82 within a specified interval each frame. These release acknowledgements are transmitted to all GWY's 82 at the end of the packet frame, regardless of whether all GWY's 82 were connected for that frame. These broadcasted release acknowledgements are part of the synchronous operation of SN 10.

As explained above in connection with the L1 protocol, SN 10 uses service requests, but does not require path requests and release requests. However, to maintain compatibility with other versions of SN 10, RB 90 is designed to ignore path requests and release requests from GWY's 82 via GC 88 if they are used.

RB 90 also distributes timing signals and control messages needed by its associated GC's 88. It receives its timing signals from MC 70.

RB 90 handles L1 protocol operations in parallel with respect to its GC's 88. More specifically, RB 90 can receive a service request from each of its GC's 88 in a 400 nanosecond (ns) period, and can transmit path acknowledgements and release acknowledgements to each of its GC's 88 in a 400 ns period. It can present a new service request to CC 98 every 100 ns.

Each RB 90 maintains an originator request memory 1108, which indicates the OGWY's 82 that have issued a service request during a packet frame. This originator request memory 1108 is organized as a 64×1 bit random access memory (RAM), with addresses 0-63 corresponding to the 64 GWY's 82 associated with that RB 90. A "1" stored at a particular address means that an originator service request has been received from the corresponding OGWY 82. Two logical RAM banks are provided for the originator request memory 1108. During a frame, one bank is used to register service requests, and the other is cleared.

NC 78 is programmed so that no more than one service request is issued during a single packet frame. This limit is used to detect cases where a faulty NC 78 or GWY 82 is issuing spurious service requests. When an originator service request is presented to RB 90, a bit in the originator request memory 1108 corresponding to the OGW 82 is examined. If it is "one", the request is deleted and not transmitted to the CC 98, an error flag is set, and a "one" is written to an originator request error memory 1110, which is organized like originator request memory 1108. MC 70 can read the error flag and any location in the originator request error memory 1110.

Figure 12:
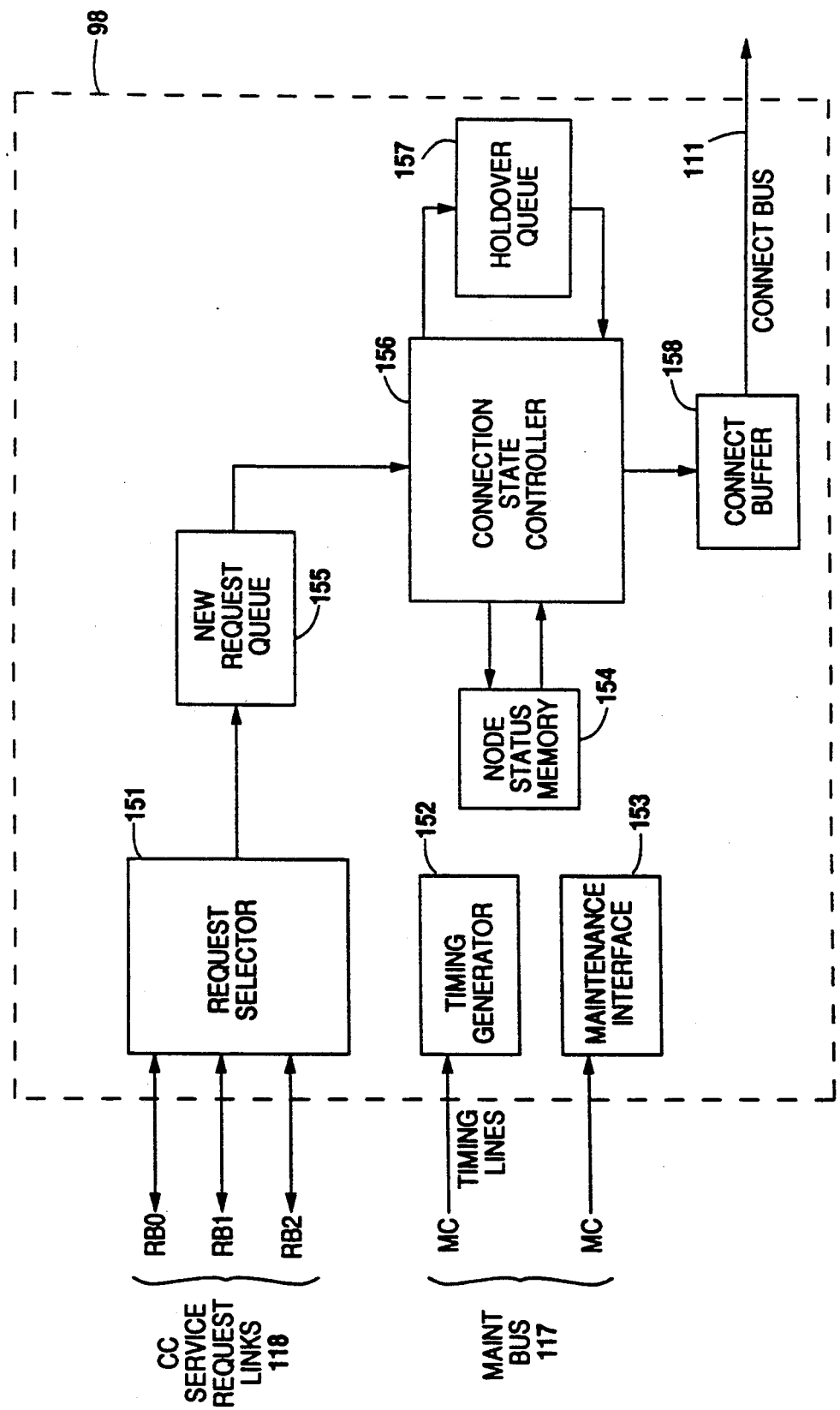
FIG. 12 is a block diagram of the connection controller.

FIG. 12 is a block diagram of CC 98. Referring to FIG. 12 and also to FIG. 3, CC 98 has the following interconnections: maintenance bus 117, CC service request links 118, and connect bus 110. Its main components are request selector 151, timing interface 152, maintenance interface 153, node status memory 154, new request queue 155, connection state controller 156, holdover queue 157, and connect buffer 158.

Maintenance bus 117 includes timing lines, over which CC 98 receives timing signals from MC 70. If desired for redundancy, a CC pair 98 may receive a timing bus from each of two MC's 70. The timing lines carry a 40 MHz clock signal, a 500 kHz L1 frame sync signal, a packet frame synchronization (PFS) signal, and a sync signal. The 500 KHz L1 frame sync signal is used for synchronizing L1 control messages.

Maintenance bus 117 also includes maintenance task lines, with which various registers of CC 98 are accessed by MC 70. Maintenance task lines may be implemented with an 8-bit, multiplexed, address-data bus, such as an RS-422 DEX control bus, with a parity bit added and having a redefined DATA OUT signal, which is used as a bus acknowledge signal to permit both read and write error detection.

Connect bus 111, at the beginning of each frame, transmits the contents of connect buffer 158, filled during the previous frame, to RB's 90 and SM 80. Connect bus 111 is a synchronous, parallel, time-multiplexed bus, with 192 timeslots. Each timeslot corresponds to 192 locations in connect buffer 158, and thus to 192 destination node addresses. The signals carried by connect bus 111 correspond to fields in connect buffer 158, which are explained below.

Referring again to FIG. 5, during a single packet frame period, CC 98 queues service requests from RB's 90, examines service request queues and establishes connections for a subsequent frame, transfers a list of connections generated during the previous frame to SM 80, and sends path acknowledgements to RB's 90. Thus, CC 98 provides the following functions:

(1) maintains a centralized queue of service requests,
(2) establishes connections for service requests,
(3) generates connection lists that control SM 80,
(4) generates path acknowledgements for RB's 90, and
(5) maintains node status memory 154.

The centralized queueing function is an important feature of the invention, which permits service requests to be processed in the order received. This is true even when the connection is deferred because of a previous connection allocation within the current processing frame. All requests that cannot be processed are deferred to holdover queue 157, in the same order as received, for processing in a subsequent packet frame.

As illustrated in FIG. 4, CC 98 generates server path acknowledgements and originator path acknowledgements in response to service requests from GC 88. These acknowledgements are transmitted to the SGW 82 and OGW 82 by CC 98 via the associated RB 90 over path acknowledge link 115 and via GC 88 over GC response bus 91. If an acknowledgement is received by GWY 82, a signal is transmitted to NC 78 via NC interface 254 to initiate the packet data transfer. An L2 busy flag indicating transmission of packet data is set on GWY 82, thereby inhibiting service requests on GC service request link 92. Separate signals are provided to NC 78 for server and originator path acknowledgements.

CC 98 receives service requests from RB's 90 via CC service request links 118 and request selector 151. In the embodiment described herein, CC 98 may process one new service request every 50 ns. Each RB 90 may deliver one new service request to CC 98 every 100 ns. Because each CC 98 controls 3 RB's 90, the maximum rate at which the 3 RB's 90 can deliver requests is greater than the rate at which CC 98 can process them. Thus, RB's 90 contend for processing by CC 98. Request selector 151 examines each of CC service request links 118 on a rotating priority basis, and places, at most, one new request into new request queue 155 every 50 ns. Request selector 151 uses a READY line, which is part of CC service request link 118, to control the flow of incoming service requests, by asserting the READY line when it is able to receive a new request. RB 90 uses the status of the READY line to set a request acknowledge bit going back to GC 88 on RB service acknowledge link 114.

CC 98 operates with two queues, new request queue 155 and holdover queue 157, in which pending requests are stored and which are organized as FIFO buffers. A connection state controller 156 reads the queues to make connections for a new packet frame.

Service requests are first stored in new request queue 155. Service requests read from new request queue 155 are honored only if both the originator and the server node addresses, which are contained in the request, correspond to idle nodes, as determined by node status memory 154. A holdover queue 157 stores requests that have been examined by connection state controller 156, but that cannot be honored because one of the two node is busy. Requests from new request queue 155 are processed after all requests in holdover queue 157 have been examined.

In the preferred embodiment, holdover queue 157 has two parts: holdover queue 157a and 157b. During a frame, deferred requests are read from queue 157a and written to queue 157b. During the next frame, deferred requests are read from queue 157b and written to queue 157a. This alternation continues for every frame. The queue that is being read during a frame is completely emptied during that frame and any deferred requests are transferred to the other queue. Queues 157a and 157b cannot hold a greater number of requests than connection state controller 156 can examine during a single frame. Queues 157a and 157b are best implemented as a single buffer, with a sentinel bit used to distinguish between entries for each queue.

A node status memory 154, organized as a RAM, contains a busy-or-idle status of each node. A node is "busy" if CC 98 has already established a connection for that node during the current frame, and has subsequently stored that connection command in connect buffer 158. A node is "idle" if no connection for that node has yet been established by CC 98 during the current frame.

In the preferred embodiment, node status memory 154 comprises two banks of 192×1 bit RAM's. Two banks permit processing of requests by connection state controller 156 during the entire frame. During one frame, a first bank is active for maintaining status and the second bank is cleared. During the next frame, the roles of the two banks are reversed. To minimize the time required to process a service request, two RAM's are used in each bank. Each location in a RAM uniquely corresponds to a node address. A "one" in a particular location indicates that the corresponding node is busy. To determine if a service request can be honored, two read operations are required, one for the originator and one for the server. If the request is granted, two write operations are required to mark both the originator and the server nodes busy. If only a single RAM is used per bank, granted requests require four memory cycles, and denied requests require two cycles. However, by using two RAM's per bank and filling them with the same data, the status of the originator node can be read from a first RAM while the status of the server node is read from a second RAM. Granted requests require two write cycles to mark both nodes busy, and thus a total of three memory cycles are required. Denied requests require only one memory cycle. Further explanation of memory cycle times is set out below in connection with connection state controller 156.

Connect buffer 158 comprises two banks of 192×13 bit RAM's. Each location, i.e., locations 0–191, in connect buffer 158 uniquely corresponds to a node address. The 13 bits of data are organized in fields as follows:

| bit | name | function |
|---|---|---|
| 1 | SERVER | When this bit is set, the node corresponding to the connect buffer location receives a server path acknowledgement signal and is connected to an originator node. |
| 1 | ORIG | When this bit is set, the node corresponding to the connect buffer location receives an originator path acknowledgement and is connected to a server node. |
| 8 | SNA | When either of the previous two bits are set, a one-way connection is established from the source node identified by this field to the destination node corresponding to the location accessed in the connect buffer 158. |
| 1 | TRACE | This bit is an active trace bit, which can be used to trigger trace logic on RB's 90 and matrix elements 161. |
| 1 | PARITY A | This is an acknowledge parity bit, generated across the SERVER, ORIG, and TRACE fields, and monitored by RB's 90. |
| 1 | PARITY C | This is a connect parity bit, generated across the SERVER, ORIG, SNA, and TRACE fields, and monitored by SM 80. |

RB's 90 receive the SERVER, ORIG, TRACE, and PARITY A signals via connect bus 111. An active SERVER signal causes RB 90 to issue a server path acknowledgment (SPAK) for the node corresponding to the particular timeslot. An active ORIG signal causes the RB 90 to issue an originator path acknowledgment (OPAK) for the node corresponding to that timeslot. SM 80 receives all the signals except PARITY A via connect bus 111. The format and operation of connect bus 111 is described below in the "Interconnections" section of this patent application.

During a frame, connection information, consisting of connection commands and path acknowledgements, for service requests is randomly written to a first bank of connect buffer 158. At the same time, connection information generated in the previous frame is sequentially read from a second bank and transferred to the connect bus interface. Connection information in the second bank is cleared as it is read so that the bank is cleared of all connection information before the beginning of the next frame. During the next frame, the roles of the two banks are reversed.

Connection state controller 156 has access to new request queue 155, holdover queue 157, connect buffer 158, and node status memory 154. Connection state controller 156 establishes connections for a packet frame, based on the requests stored in queues 155 and 157 and on the status conditions of node status memory 154.

At the beginning of each frame, connection state controller 156 performs bank swaps on node status memory 154, holdover queue 157, and connect buffer 158. As explained above, for node status memory 154 and connect buffer 158, information associated with new connections are stored in the RAM bank that was cleared in the prior frame. For holdover queue 157, service requests are read from the bank that was loaded in the last frame and new deferred requests are written into the other bank. If holdover queue 157 contains requests deferred from a previous frame, connection state controller 156 processes them before it processes requests from new request buffer 155.

CC 98 is designed to maximize the number of service requests that can be processed per frame. To this end, connection state controller 156 performs several operations in parallel. Simultaneously, it processes service requests from holdover queue 157 or new request queue 155, transfers connection information from connect buffer 158 via connect bus 111 to RB's 90 and matrix elements 161, and clears the bank of node status memory 154 used during the previous frame.

As indicated above, service request processing requires either one or three memory cycles, depending on whether the request is granted or denied. During the first cycle, the busy/idle status of the originator and server nodes are simultaneously read from the currently active bank of node status memory 154. If either node is busy, connection state controller 156 writes the request to holdover queue 157 for deferred processing during the next processing frame, and examines the next request. If both nodes are idle, two additional memory cycles are required. In the second cycle, the server is marked busy in both parts of the active bank of node status memory 154, the address of the originator node is written to the SNA field of the connect buffer location associated with the server node, the SERVER bit is set, the ORIG bit is cleared, and the trace and parity bits are appropriately set. In the third cycle, the originator is marked busy in both parts of the active bank of node status memory 154, the address of the server node is written to the SNA field of the connect buffer location associated with the originator node, the ORIG bit is set, the SERVER bit is cleared, and the trace and parity bits are appropriately set. Thus, at the end of the processing cycle, both nodes will be marked busy in node status memory 154, and two one-way connection commands, i.e., server to originator and originator to server, are stored in connect buffer 158 together with associated path acknowledgements.

For the special case where the originator node and server node are the same, connection state controller 156 is designed so that both the SERVER and ORIG bits are set in connect buffer 158 at the location corresponding to the node. One method of doing this is for connection state controller 156 to detect that the two node addresses are equal, and then set SERVER and ORIG simultaneously during memory cycles two and three.

Any requests deferred from a previous frame, i.e., those stored in holdover queue 157, are processed at the beginning of the next frame before new requests are processed. After all deferred requests have been processed, new requests are processed until new request queue 155 is empty or until the end of the frame period. At the end of the frame period, the connection processing sequence is repeated and a new connect buffer is created. While the new buffers are being created, information in connect buffer 158 from the previous frame is transferred to RB's 90 and SM 80 via connect bus 111.

Referring again to FIG. 5, CC 98 is allotted an entire packet frame period to examine originator service requests held in its queues and to establish as many paths to fulfill these requests as possible. The requests will be accomplished with packet transfers in a subsequent frame. After CC 98 has examined as many requests as possible in a frame period, a list of connection commands for that frame is transferred to SM 80 via connect bus 111 during the next frame.

Maintenance Controller

MC 70 is similar to the analogous component described in U.S. Pat. No. 4,885,739, except for the generation of the packet frame synchronization (PFS) signal. This signal, as discussed above in connection with FIG. 5, defines the packet frame period used for synchronization. The duration of this period is variable, and is set using a register of MC 70.

In addition to the PFS signal, the timing bus from MC 70 to CC 98 contains a 40 MHz clock, a 500 kHz L1 frame sync signal and a sync signal.

The packet frame synchronization signal is distributed to RB's 90 and SM 80, as well as to CC 98. NC's 78 are synchronized to the packet frame synchronization signal via a broadcast facility of SM 80. RB's 90 transmit clock and L1 frame sync signals to GWY's 82 for timing Li messages.

Switching Matrix

Switching matrix (SM) 80 makes point-to-point packet link connections, under control of CC 98. In the redundant embodiment, SM 80 is a pair of switching matrix planes, with each matrix plane being a single stage matrix that supports 192 access nodes.

Figure 13:
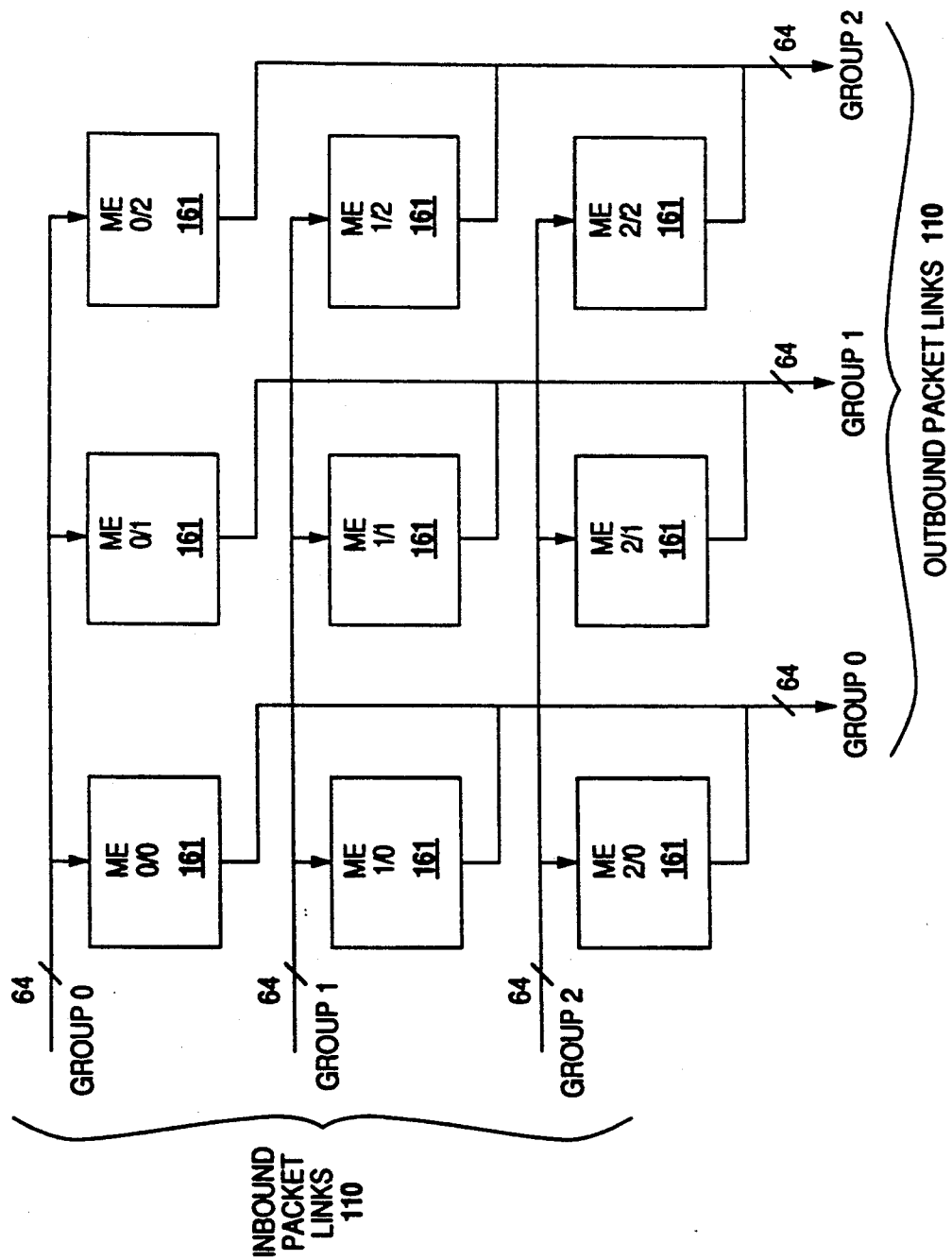
FIG. 13 is a block diagram of a matrix plane of the switching matrix.

FIG. 13 is a block diagram of a matrix plane of SM 80, which is divided into rows and columns. FIG. 13 also illustrates the matrix elements 161, which constitute SM 80. Each matrix element 161 is a 64×64 link crosspoint switch, and can connect any of 64 inbound packet links 110 to any of 64 outbound packet links 110. Matrix elements 161 are controlled by CC 98 via connect bus 111. As explained below, inbound packet links 110 are multi-dropped to matrix elements 161 in each matrix row. Matrix elements 161 in a matrix column are wire OR'd to outbound packet links 110.

As illustrated in FIG. 5, during each frame, CC 98 transmits a new list of connection commands to SM 80. The list is stored in SM 80 for execution during the next frame. All of the stored connection commands are executed simultaneously, synchronized by the PFS signal.

Matrix ports, which are associated with GWY's 82, are divided into three groups, shown as groups 0, 1, and 2. Ports in group 0 are connected to the inbound side of row 0 and to the outbound side of column 0, with the ports of groups 1 and 2 being connected analogously. Thus, each row forms an inbound group and each column forms an outbound group. The 64 inbound links associated with a row are multidropped to the other elements in the group.

Each of the 64 outbound packet link drivers on a matrix element 161 is independently enabled by a connection command. For this reason, an additional level of multiplexing can be provided by using wired OR logic. More specifically, a group of up to 3 matrix elements 161 in the same column may have their outbound packet links wire OR'd, and any of the 64 outbound packet links associated with this group of matrix elements 161 may be connected to any of the 192 inbound links. The logic of each matrix element 161 ensures that for each outbound packet link, connection commands are interpreted so that only one driver in this group of matrix elements 161 drives an outbound packet link 110 during a frame.

A connection command from a port A in group i to a port B in group 2 results in a one-way connection. Thus, two connection commands are required to establish a two-way connection, i.e., A to B and B to A. The connection from A to B is accomplished by matrix element 161(1/2), and the connection from B to A is accomplished by matrix element 161(2/1). For this two-way connection, the drivers corresponding to the outbound link of B on matrix elements 161(0/2 and 2/2) must be in the high impedance state. Similarly, the drivers corresponding to the outbound link of A on matrix elements 161(0/1 and 1/1) must be in the high impedance state. Therefore, in this example, connection commands received from CC 98 are decoded by six matrix elements 161.

Matrix elements 161 receive timing signals from MC 70. If there is a MC pair 70, timing select signals from MC 70 cause each matrix element 161 to select one copy of the timing signals as the active copy. In the timing scheme of this description, matrix elements 161 operate at the packet link rate of 40 Mbits per second.

Matrix elements 161 buffer connection commands during each packet frame for execution in the next frame. At the beginning of a packet frame, all of the connection commands buffered in the prior frame are simultaneously executed so that all connections persist for the entire frame.

An additional outbound port, port 64, may be provided on matrix element 161 to support a fault isolation function. In operation, this port may be connected to any inbound port. The selection of the port to be monitored is under the control of MC 70 via a control register on matrix element 161, To implement this function, a packet link monitor connected to outbound port 64 is provided on each matrix element 161. The monitor is capable of selecting any of the 64 inbound links associated with a matrix element 161 for monitoring parity and trace signals carried on the packet links, using an L2 trace facility. When NC 78 detects a connection fault, monitor logic is invoked to permit the fault to be isolated to a single matrix element 161.

An additional inbound port, port 64, is also provided on each matrix element 161 to support a packet broadcast function. A broadcast buffer on the matrix element 161 that can be loaded with a packet from MC 70 is connected to this port. The packet in the broadcast buffer is transmitted to port 64 continuously, once within a specified interval each frame. Timing of the packet transmission with respect to the PFS signal is such that it can be used to synchronize the NC's 78 to the PFS signal.

When a broadcast message is to be executed, MC 70 loads the packet in the broadcast buffers of all matrix elements 161 in a selected matrix row, i.e., 0/0, 0/1, and 0/2, before executing a broadcast command to CC 98. The broadcast command to CC 98 causes all outbound ports to be connected to the selected broadcast buffers for one packet frame period. Thus, the packet in the broadcast buffer is simultaneously transmitted to all nodes of SN 10. CC 98 uses the SNA field of its connection commands, which is described above, to initiate a packet broadcast.

Interconnections

FIGS. 14 - 17 illustrate the format for the various links used in the switching process. Abbreviations for the signals and messages carried by these links are set out above in the first section of this patent application.

FIG. 14 illustrates the format for RB service request link 113, which carry service requests from GC's 88 to RB's 90. The SGWA0-SGWA3 fields contain the gateway address within a gateway group for the server node. The SGPA0-SGPA3 fields contain the server group address of the server node. The OGWA0-OGWA3 fields contains the gateway address within a gateway group for the originator node. The address of the originator group is implied because the GC 88 to RB 90 service request links are fixed point-to-point and the GC 88 from which the RB 90 receives the request determines the group address. The ABORT bit is used to indicate that data in the address fields is not valid due to error detected by GC 88. When the RSTB is set in a request field, a request for connection is sent to RB 90. The RSTB is not related to other data in the field, but is a look-ahead request for a pending service request in the GC 88 buffer. If valid data is contained in the field for which the RSTB is asserted, the data is associated with a previous RSTB that has already been acknowledged to the GWY 82 by CC 98. When TRC is set in a request field, a trace is indicated for the service request that is being currently transmitted. PAR contains the parity for the 12 bits in the field.

FIG. 15 illustrates the format for RB service acknowledge links 114. Although a RB 90 is capable of receiving a service request from each of its four associated GC's 88 simultaneously, a flow control mechanism is need to control contention at CC 98. The request acknowledge signal (RACK) on the RB service acknowledge link 114 is used to implement this flow control. The RACK strobe is generated by RB 90 in response to RSTB signal on the RB service request link 113. RACK is used to indicate that the associated RB service request link 113 is connected to a receiver on RB 90 and that a new service request may be presented. DSTB is always held inactive so that GC 88 will not register the data in the unused OGPA field.

FIG. 16 illustrates the format for RB path acknowledge links 115, which connect RB's 90 to GC's 88 for path acknowledgements. Although path requests are not required, path acknowledge links 115 may be used for compatibility with other switching networks that use them. OGWA0-OGWA3 contain the gateway address within a gateway group for the originator node. Group addresses are not used. SGWA0-SGWA3 contain the gateway address within a gateway group for the server node. RACK is held active. OSTB is a strobe that indicates that the field in which it is presented contains an OPAK. SSTB indicates that the field in which it is presented contains a SPAK. One field may contain either an OPAK or SPAK or both. If the originator and server are in the same group, the acknowledgement field will contain both. When TRC is set in an acknowledge field, a trace is indicated for the path acknowledgement currently being transmitted. PAR contains the parity for the other bits in the field.

FIG. 17 illustrates the format for the RB release acknowledge link 116, which connects RB's 90 to GC's 88 for release acknowledgements. Because of centralized queueing and PFS operation, release requests are not required. However, for compatibility with switching networks that use release requests, they have no effect if used. OGWA0-OGWA3 contain the gateway address within a gateway group for the originator node. Group addresses are not required. SGWA0-SGWA3 contain the gateway address of the gateway group for the server node. RACK is held active. OSTB is a strobe that indicates that the field in which it is presented contains an ORAK. SSTB indicates that the field in which it is presented contains a SRAK. One field may contain either an ORAK or SRAK or both. If the originator and server are in the same group, the acknowledgement field will contain both. When TRC is set in a release acknowledge field, a trace is indicated for the release acknowledgement currently being transmitted. PAR contains the parity for the other bits in the field.

Referring again to FIG. 3, CC service request link 118 is a point-to-point interconnect link that carries service requests from the RB's 90 to CC 98, and the READY signal from CC 98 to RB's 90. It is a synchronous, parallel link with 20 lines. OAD0-OAD7 contain the gateway group address and gateway address for the originator node. SAD0-SAD7 contain the gateway group address and gateway address for the server node. PAR contains the parity for the address bits. RSTB is asserted when OAD0-OAD7 and SAD0-SAD7 contain the node addresses for a valid service request. When TRC is set, a trace is initiated for the current service request. READY is asserted when CC 98 can accept another service request.

FIG. 3 also illustrates connect bus 111, which sends a list of connection commands for a given packet frame to SM 80, and sends the list of path acknowledgements to RB's 90. For redundancy, each CC 98 provides two copies of the bus, one for each redundant matrix 161. Connect bus 111 is a 13-bit synchronous, time-multiplexed bus with 192 timeslots. Each timeslot is uniquely associated with a destination node address. The presence of either an originator connection strobe (ORIG) or a server connection strobe (SERVER) in a timeslot indicates that a connection command is being transmitted in that timeslot. Two strobes are used because the connect bus 111 transmits path acknowledgements as well as connection commands. Although SM 80 does not distinguish between server and originator commands, path acknowledgements must distinguish the two signal types. SERVER and ORIG signals are OR'd to produce a strobe indicating a valid connection command for that timeslot. Thus, whenever SERVER or ORIG are active, SM 80 establishes for the following packet frame, a connection from a source node, whose address is contained in the SNA signal, to a destination node, whose address is the associated timeslot for which either SERVER or ORIG or both was active. SNA0-SNA7 contain the address of the source port for the connection. An active ORIG indicates that the timeslot contains a connection command and that the node associated with the timeslot is a originator for this transaction. An active SERVER indicates that the timeslot contains a connection command and that the node associated with the timeslot is a server for this transaction. The TRACE bit activates trace logic on the SM 80 and RB's 90. PARITY A is a parity bit generated across the SERVER, ORIG, and TRACE bits; PARITY C is generated across SERVER, ORIG, TRACE, and SNA bits.

Other Embodiments

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

WHAT IS CLAIMED IS

1. A switching network for providing data communication between user processors of processor-based communications equipment, where the user processors are arranged in clusters, each cluster having a node controller, comprising:

a switching matrix for establishing point-to-point connections between originating processors and destination processors;

an interchange control system in communication with said switching matrix, said interchange control system having at least one request buffer for receiving service requests from said originating processors, and having a connection controller for maintaining a central queue of said service requests and for establishing connections within said switching matrix in accordance with said service requests;

a plurality of gateways for providing access from the node controllers to said switching matrix for transmissions of the data and for providing access from said node controllers to said interchange control system for transmissions of said control messages;

at least one gateway group controller for controlling the operation of said gateways;

wherein said interchange control system and said gateway group controller are programmed to recognize certain control messages, including said service requests;

a timing generator for providing a synchronization signal to said interchange control system and said gateway group controller, such that all processing of said control messages occurs in periodic cycles.

2. The switching network of claim 1, wherein said switching matrix includes memory for storing connection commands during one cycle for execution during a subsequent cycle.

3. The switching network of claim 1, wherein said switching matrix comprises matrix elements having packet link drivers for each of a number of outbound packet links, wherein each of said link drivers is independently enabled by a connection command.

4. The switching network of claim 1, wherein said switching matrix has an outbound port for broadcasting packets to all of said gateways simultaneously.

5. The switching network of claim 1, wherein said request buffer includes a multiplexer for multiplexing said service requests from an associated one of said gateways to said connection controller.

6. The switching network of claim 1, wherein said request buffer includes memory for storing path acknowledgements from said connection controller during one cycle and interface circuitry for transferring them to an associated gateway during a subsequent cycle.

7. The switching network of claim 1, wherein said request buffer generates and broadcasts release acknowledgements to all its associated gateways simultaneously.

8. The switching network of claim 1, wherein said request buffer sends path acknowledgements and release acknowledgements during the same cycle.

9. The switching network of claim 1, wherein said request buffer includes an originator request memory for determining which of said gateways have issued a service request during a particular cycle.

10. The switching network of claim 1, wherein said connection controller includes a new request queue for storing current service requests and a holdover queue for storing deferred service requests and a controller for reading said queues.

11. The switching network of claim 10, wherein said connection controller further comprises a request selector for examining incoming service requests on a priority basis and placing a new request in said new request queue.

12. The switching network of claim 1, wherein said connection controller is programmed to simultaneously queue service requests, examine pending queues, establish connections, and transfer connections to said switching matrix during a single cycle.

13. The switching network of claim 1, wherein said connection controller maintains a node status memory for monitoring the busy status of nodes associated with said gateways.

14. The switching network of claim 1, wherein said connection controller has a connect buffer for storing connection commands, and a controller for performing memory swaps on alternate banks of said buffer.

15. The switching network of claim i, wherein said connection controller has a state controller programmed to process a service request and its associated packet data transfer during a predetermined number of cycles.

16. The switching network of claim 1, wherein said switching matrix has means for broadcasting a packet, such that said packet is simultaneously delivered to all nodes associated with said gateways.

17. The switching network of claim 1, wherein said protocol consists only of requests for service, request acknowledgements, path acknowledgments, and release acknowledgements.

18. A switching network for providing data communication between user processors of a processor-based communication equipment, where the user processors are arranged in clusters, each cluster representing a communications node, comprising:
- a switching matrix for establishing point-to-point connections between originating processors and destination processors;
- an interchange control system in communication with said switching matrix, said interchange control system having a request buffer for receiving service requests from said originating processors and having a connection controller for generating connection commands in response to said service requests and sending said connection commands to said switching matrix;
- a plurality of gateways for sending and receiving packet data between said originating processors and said destination processors, wherein said gateways provide access by said processors to said switching matrix for transmission of said data and provide access by said processors to said interchange control circuit for transmission of said service requests;
- at least one gateway group controller for controlling the operation of said gateways;
- wherein said interchange control system and said gateway group controllers are programmed such that their operations are synchronized to a packet frame synchronization signal that defines a current frame period for each current data packet to be communicated; and
- a timing generator for providing a timing signal to said interchange control system and said gateway group controller that defines said packet frame synchronization signal.

19. The switching network of claim 18, wherein said switching matrix is programmed to respond to said connection commands for a current data packet during said current frame period.

20. The switching network of claim 18, wherein said gateways are programmed such that a current data packet is transferred between said gateways during said current frame period.

21. The switching network of claim 18, wherein said connection controller is programmed to make path connections for a next packet frame transfer during said current packet frame.

22. The switching network of claim 18, wherein said connection controller is further programmed to transfer said path connections to said switching matrix during said current frame.

23. The switching network of claim 18, and further comprising node controllers for controlling the activities of the cluster of processors, wherein said node controllers are also synchronized to said packet frame synchronization signal.

24. The switching network of claim 23, wherein said node controllers are programmed to check for path acknowledgements during said current frame period.

25. The switching network of claim 18, wherein said buffer circuit further generates release acknowledgements, and wherein said interchange control circuit is programmed to transfer a release acknowledgement associated with the transfer of a current packet frame during said current frame period.

26. The switching network of claim 25, wherein said interchange control circuit is programmed to transfer said release acknowledgements to each of said gateways during said current frame period.

27. The switching network of claim 25, wherein said switching network includes a packet broadcast means for transferring said release acknowledgements to each of said gateways.

28. The switching network of claim 1, further comprising means for varying the period of said packet frame synchronization signal.

29. A switching network for providing data communication between user processors of processor-based communications equipment, where the user processors are arranged in clusters, each having a node controller, comprising:
- a switching matrix for establishing a point-to-point connections between originating processors and destination processors;
- an interchange control system in communication with said switching matrix, said interchange control system having a request buffer for queueing service requests from said originating processors, and having a connection controller for maintaining said queue and for establishing connections within said switching matrix in accordance with said service requests;
- a plurality of gateways for sending and receiving packet data between said originating processors and said destination processors and for sending and receiving control messages to and from said interchange control system, said control messages including said service requests, wherein said gateway circuits provide access from the node controllers to said switching matrix for transmissions of the data and provide access from said node controllers to said interchange control circuit for transmissions of said control messages;

packet links connecting said switching matrix to said gateways, for transferring packet data;

a gateway bus connecting said originating processors and said destination processors to said gateways;

a first level of service request links connecting said gateways to said interchange control circuit;

a second level of service request links connecting said request buffer to said connection controller within said interchange control circuit;

a connect bus connecting said connection controller to said switching matrix; and timing lines for providing a synchronization signal to said switching network, said interchange control circuit, and said gateway circuit, such that all processing occurs in periodic cycles.

30. The switching network of claim 29, and further comprising a controller for generating said synchronization signal and a bus for transmitting said signal from said maintenance controller to said switching matrix and to said interchange control circuit.

31. The switching network of claim 29, wherein timing signals are further transmitted to said gateway circuit from said interchange control circuit, for timing control messages.

32. The switching network of claim 29, wherein said switching matrix includes a packet broadcast means for transmitting timing signals to said node controllers for synchronizing the operation of said node controllers.

33. A method for providing connections between an originating processor and a destination processor for the purpose of communicating digital data, in accordance with a set of connection command protocols that need not include requests to release a connection, comprising the steps of:

receiving packet data from an originating processor at an origination gateway, wherein said packet data includes an address of a server gateway and a destination processor;

sending a service request from said origination gateway to an interchange control circuit;

forming a point-to-point connection between said origination gateway and said server gateway if neither gateway is busy;

transferring said data from said originating processor to said destination processor;

wherein said receiving, sending, forming, and transferring steps are synchronized such that connection releases occur automatically as a result of lapsed interval of time.

34. The method of claim 33, and further comprising the step of maintaining a central queue of said service requests.

35. The method of claim 33, wherein said step of forming a point-to-point connection is performed with respect to a current service request during the same packet period as said step of transferring said data with respect to a previous second service request.

36. The method o claim 33, and further comprising the step of acknowledging said step of forming a point-to-point connection, wherein said acknowledging step is performed during the same packet frame period with respect to a current frame as said step of forming a point-to-point connection for that frame.

37. A method for providing connections between an originating processor and a destination processor for the purpose of communicating digital data, in a network having an interchange control circuit for generating connection commands and gateways for providing an interface to origination and destination nodes, comprising the steps of:

providing a timing signal representing a packet frame period;

sending a path acknowledgement from an interchange control circuit to a gateway associated with a originating processor node within said packet frame period for a current data packet;

transferring said current data packet within said packet frame period to a destination processor node, using a switching matrix in communication with said gateway;

sending a release acknowledgement from said interchange control circuit to said gateway within said packet frame period for said current data packet;

wherein each of said steps occurs during the same packet frame period.

38. The method of claim 37, and further comprising the step of generating a path acknowledgement for a next subsequent packet within said interchange control circuit during the same packet frame period.

39. The method of claim 37, and further comprising the step of generating connection commands from said interchange control circuit to said switching matrix for a next subsequent packet during the same packet frame period.

40. The method of claim 37, and further comprising the step of transferring connection commands to said switching matrix during the same packet frame period.

* * * * *

UNITED STATES PATENT AND TRADEMARK OFFICE
CERTIFICATE OF CORRECTION

PATENT NO. : 5,218,602
DATED : June 8, 1993
INVENTOR(S) : Grant et al.

It is certified that error appears in the above-identified patent and that said Letters Patent is hereby corrected as shown below:

Column 4, line 22, after "group of GWY's 82", please insert --. --.

Column 8, line 53, after "error memory", please insert -- 1110, --.

Column 9, line 54, after "connect bus", delete "110" and insert --111--.

Column 14, line 19, after "timing", delete "Li" and insert -- L1 --.

Column 14, line, 65, after "in group", delete "i" and insert -- I --.

Column 15, line 29, after "161", delete "," and insert --. --.

Column 15, line 44, after "interval", insert --, --

UNITED STATES PATENT AND TRADEMARK OFFICE
CERTIFICATE OF CORRECTION

PATENT NO. : 5,218,602
DATED : June 8, 1993
INVENTOR(S) : Grant et al.

It is certified that error appears in the above-identified patent and that said Letters Patent is hereby corrected as shown below:

Column 16, line 24, after "is", delete "need" and insert -- needed --.

Column 21, line 45, after "destination processor;", insert -- and --.

Column 21, line 45, after "destination processor;", and insert -- and --.

Column 22, line 9, after "The method", delete "o" and insert -- of --.

Column 22, line 35, after "current data packet;", insert -- and --.

Signed and Sealed this

Sixth Day of December, 1994

Attest:

BRUCE LEHMAN

*Attesting Officer*   *Commissioner of Patents and Trademarks*